United States Patent Office 3,162,605

Patented Dec. 22, 1964

3,162,605

PROCESS FOR PREPARING A THORIA AQUASOL

Paul C. Yates, Brandywine Hundred, Del., assignor to E. I. du Pont de Nemours and Company, Wilmington, Del., a corporation of Delaware No Drawing. Filed Jan. 26, 1962, Ser. No. 169,136
3 Claims. (Cl. 252—301.1)

This invention relates to processes for producing thoria aquasols and is more particularly directed to such processes comprising the steps of (1) calcining a thermally unstable, oxygen-containing thorium compound at a temperature in the range of from 400 to 1100° C. until it is decomposed to thoria, (2) mixing the so-obtained thoria, in powder form, with an aqueous solution of a thorium salt of a monobasic acid, the molar ratio of thorium salt to thoria being in the range of $3\times10^{-4}$A to $20\times10^{-4}$A, where A is the surface area of the thoria in square meters per gram as calculated from the crystallite dimensions determined by X-ray line broadening, and (3) heating the mixture to a temperature in the range from 50 to 100° C., at a pH in the range from 2 to 4, whereby the thoria is peptized to form a sol in the aqueous medium.

Methods hitherto known for producing thoria aquasols either have been slow and cumbersome or have involved the use of expensive materials. In either case the cost of the thoria aquasols produced is higher than desired. For instance, it has recently been proposed to remove anions by ion exchange from such thorium salts as thorium nitrate, and while concentrated thoria sols of good quality can be produced in this manner the ion exchange resins used are expensive and of limited capacity and this is reflected in the cost of the thoria aquasols obtained.

It has also been known that thorium oxalate can be calcined to a fine powder, and it has been suggested that this powder might be suspended in water to form a sol; but the conditions necessary for producing sols of good stability at practicable concentrations have not been recognized or proposed in the prior art.

Now according to the present invention it has been found that if a thermally unstable, oxygen-containing thorium compound is calcined at a temperature in the range of 400 to 1100° C. to decompose it to thoria, the thoria obtained, in powder form, is mixed with an aqueous solution of a thorium salt of a monobasic acid within certain specific molar ratios of thorium salt to thoria, these ratios being determined by the surface area of the thoria, and the mixture is heated at 50 to 100° C. and a pH of 2 to 4, thoria can be peptized to form an aquasol of good quality at a minimum of cost.

CALCINING

In the calcining step a thorium compound is heated at a temperature sufficient to decompose it to thorium oxide. Thus, the compound is one which is thermally unstable. The compound selected is also one containing oxygen. While the self-contained oxygen is sufficient to provide the oxygen requirements to form thoria, the calcining operation will usually be carried out in the presence of an oxygen-containing gas such as air.

In a particularly preferred calcining operation the thorium compound is selected from the group consisting of the oxalate, nitrate, hydroxide, basic oxalate, and basic nitrate. These compounds lend themselves especially well to thermal decomposition to form the kind of thorium oxide particles especially adapted for peptization to a sol in the subsequent steps.

The calcining operation is in all instances carried out at a temperature in the range of 400 to 1100° C. and, of course, at a temperature above the decomposition point of the selected thorium salt. Even within this temperature range, however, certain precautions can be observed with beneficial effect.

It is desirable to initiate the calcining at a temperature well below that ultimately to be reached, particularly in those cases where the decomposition products burn in the calcining atmosphere. This is of particular importance with thorium oxalate. It has been observed that if the initial calcining temperature is relatively high, the oxalate decomposition products burn within the bed of thorium salt and cause local overheating which leads to an excessive degree of aggregation in the ultimate sol to be produced. This can be avoided by starting the calcining at a relatively low temperature—in the case of thorium oxalate, in the range of 450 to 550° C. Local overheating can also be avoided by calcining a hydrated oxalate containing sufficient water of hydration to furnish a protective blanket of steam during the decomposition, and thus cause the decomposition products to burn above the bed rather than within it. Calcining in an inert atmosphere is also effective, but under these circumstances it is difficult to get rid of all the carbon which results. The preferred process is to calcine in two stages—first, in the range of 450 to 550° C., and then at any higher temperature required to produce the desired thoria particle size.

The time of calcining is related to the temperature used and also to the size of the ultimate particles desired. The time is varied inversely with the temperature, so that the higher the temperature, the shorter the time of calcining. In any event the time must be such as to decompose the thorium compound to the oxide.

Particle size can be controlled by correlating the time of heating and the maximum calcining temperature. Over the range of calcining temperatures at 500 to 1100° C., thoria particles ranging from about 10 millimicrons to 500 millimicrons can be produced. The exact effective temperature will depend somewhat on the particular salt of thorium which is employed.

It is preferred that the thoria be calcined for at least a half hour and preferably for one hour at the maximum temperature employed. During this time the thoria particles grow into the desired size range. Heating for longer periods will cause some additional growth but at a much reduced rate. Therefore, while a half hour to one hour may be the minimum time, the maximum time of calcining may be many hours or even several days, although no substantial advantage accrues from using such longer times.

The calcining is carried out in non-reactive vessels. Porcelain or silica are among the preferred materials used for such vessels. Stainless steel, for instance, reacts with thoria to contaminate the product, the contamination interfering with the subsequent peptization step.

MIXING WITH THE SALT OF MONOBASIC ACID

Following the calcining step the thoria, in powder form, is mixed with an aqueous solution of a thorium salt of a monobasic acid. The thoria is, of course, first cooled sufficiently that it can be mixed with water without violent reaction due to excessive temperature differential. If the thoria is not in powder form as it comes from the calcining step, it should be broken up into a powder. Thus, loose aggregates can be subdivided, but sintered masses resulting from excessive calcining temperatures are to be avoided as above described.

The thorium salt of monobasic acid used must, of course, be water soluble. Suitable thorium salts include the chloride, perchlorate, bromide, bromate, iodide, iodate, or nitrate, the chloride and especially the nitrate being preferred.

The concentration of thorium salt should be sufficient to give a molar ratio of salt to thoria powder within the specified range at the desired thoria content. Thus, if a sol containing a predetermined percentage of thoria is to be made, the concenetration of thorium salt in the aqueous solution can be calculated from the indicated molar ratio.

The mol ratio of thorium salt to thoria must be within the range of $3\times10^{-4}$A to $20\times10^{-4}$A, where A is the surface area of the thoria in square meters per gram. In preferred processes of the invention this molar ratio will be in the range from $6\times10^{-4}$A to $15\times10^{-4}$ A. The surface area herein referred to is the value calculated from the thoria particle size.

The particle size of the thoria can be calculated by determining the particle size of the thoria crystallites from X-ray measurements. The determination of crysallite size from the line broadening of X-ray diffraction lines is well known in the art. The amount of a water soluble salt having a monovalent anion required to peptize the thoria is related to the particle size as determined by X-ray by the expression:

$$\frac{600}{C}=A$$

where C is the crystallite size in milimicrons of the thoria crystallites as determined from X-ray line-broadening measurements, and A is the specific surface area in square meters per gram. This value can then be used in the expression for determining the mol ratio of soluble thorium salt to thoria powder.

When using the amounts of thorium salt nearer the lower limit of the specified range, it has been found that there is a tendency for the pH of the system to become too high for satisfactory peptization. In such instances acid can be used in addition to the thorium salt to obtain a pH adjustment, so as to allow the thorium salt to function in the proper manner as a peptizing agent. Any strong monovalent acid having an acid dissociation constant in excess of $10^{-3}$ can be used for this purpose, but it is often more convenient to use an acid having the same anion as the thorium salt. Thus, if the thorium salt used is the nitrate, one can use nitric acid for pH adjustment.

The pH will in any event be maintained within the range of 2 to 4 during the peptization step. A pH in the range of 2.5 to 3 is most preferred.

HEATING TO PEPTIZE

To obtain the desired peptization of the thoria, the dispersion of thoria in the aqueous solution of the thorium salt of a monobasic acid is heated to a temperature in the range of 50 to 100° C. In the preferred processes of the invention the heating temperature is in the range from 75 to 98° C.

The time of heating must be sufficiently long to peptize the thoria and form a colloidal sol in the aqueous medium. Experience has shown that this time will usually range from a few minutes—say, five minutes—to as long as an hour. The exact time required will depend upon the concentration of the thorium salt and the temperature, peptization being more rapid at the higher temperatures within the specified range. Agitation of the mixture also speeds up peptization; hence, in a preferred aspect of the invention vigorous agitation is supplied during the peptizing step. The progress of peptization can be ascertained by periodic observations under the ultramicroscope or by sedimentation tests.

UTILITY

The processes of this invention are useful in preparing sols of thoria particles in a non-aggregated condition, the sols having a high level of stability against sedimentation or separation and a predetermined particle size within the range from about 10 to 500 millimicrons.

The sols produced are useful as a source of thoria particles for the dispersion hardening of metals. For example, the sols can be used in processes described in Alexander et al. Patent 2,949,358, issued August 16, 1960, or Alexander et al. Patent 2,972,529, issued February 21, 1961.

Sols prepared by processes of this invention are also useful in atomic energy applications where it is desired to maintain thoria in a stable suspension as a breeder fuel material.

The various sols produced also have utility as reactive bonding agents for larger particle size thoria powders in preparing refractory thoria bodies, and in making coatings of thoria by techniques such as flame spraying or solution spraying.

EXAMPLES

The invention will be better understood by reference to the following illustrative examples.

*Example 1*

A hydrated thorium oxalate was precipitated by mixing 2840 grams of thorium nitrate tetrahydrate dissolved in 4.6 liters of distilled water with a solution containing 1300 grams of oxalic acid dihydrate dissolved in 12.4 liters of distilled water, over a period of five hours and forty-five minutes. Precipitation was effected by dropping the oxalate solution into the thorium nitrate solution. Stirring was continued for forty-five minutes after the precipitation reaction was completed. The reaction mixture was then allowed to stand overnight. The following morning, approximately 11 liters of the supernatant liquid was decanted off. The remaining cake was filtered and then washed twice by reslurrying in 6 liters of distilled water and filtering after each reslurrying. The filter cake was dried overnight in a vacuum oven at a temperature of 85 to 90° C. This yielded a product comprising 69.5% thorium oxalate and 30.5% water, with a total yield of 2880 grams.

The thorium oxalate product was calcined for two hours at 650° C. The cooled, calcined thoria obtained from this operation had a nitrogen surface area of 26 square meters per gram and a thoria crystallite size, determined by X-ray line broadening, of 13 millimicrons. A series of thoria sols was prepared from this calcined material by mixing 20-gram portions of the solids with 80-gram portions of water and with an amount of 10% thorium nitrate tetrahydrate solution as indicated in Table 1. The time required to peptize, as well as the pH, specific resistance at 25° C., and percentage of light transmission of the resulting sols, are also given in Table 1, the light transmission being as measured on a Fischer electrophotometer using a 425 B filter.

Table 1 shows that if only small amounts of thorium nitrate tetrahydrate are used as peptizing agent, the pH is initially too high to allow peptization to occur. When the pH is adjusted to about 3, the sample does peptize, but it takes a long time to peptize at this low level of thorium nitrate; also, a more turbid sol results than when larger quantities of thorium nitrate are used. Furthermore, too large an amount of thorium nitrate causes, first, a decreased percentage transmission of light in the electrophotometer, and, in the event that amounts of thorium nitrate larger than those specified by the formula for mol ratio stated above are used, ultimately no peptization at all.

TABLE 1

| Solution No. | Gm. 10% $Th(NO_3)_4$—$4H_2O$ aq. soln. | Initial pH | Final [1] pH | Min. heating at 80° C. to peptize | Specific Resistance, ohms | Percent Transmission of a 1% sol. | Remarks |
|---|---|---|---|---|---|---|---|
| 1 | 2 | 6.7 | 3.20 | 60 | 1,470 | 6 | Would not peptize until after pH adjustment. |
| 2 | 5 | 5.1 | 3.10 | 45 | 1,120 | 13 | |
| 3 | 10 | 2.91 | | 12 | 400 | 35 | |
| 4 | 20 | 2.72 | | 7.5 | 136 | 35 | |
| 5 | 30 | 2.72 | | 5 | 90 | 23.5 | |
| 6 | 52 | 2.60 | | (2) | 64 | (3) | |

[1] Adjusted to this value with dilute aqueous $HNO_3$.
[2] Would not peptize.
[3] Too low to measure.

*Example 2*

Thorium oxalate was prepared in the same manner as in Example 1, except that after preparation of the oxalate, calcining was done at several different temperatures. In all instances, initially, calcining was done at 500° C. for two hours, followed by an additional two hours of calcining at the temperatures indicated in Table 2. Table 2 also shows the nitrogen surface area, in square meters per gram, of the calcined thoria, its X-ray crystallite size in millimicrons, and the grams of thorium nitrate tetrahydrate per gram of thoria used in peptizing these calcined thorias to essentially completely dispersed sols. The results given in this example show the effect of calcining temperatures on the ultimate particle sizes obtained, and the adjustments which must be made in the amount of thorium nitrate to be used in peptizing them as a consequence of their changes in particle size.

*Table 2*

| Calcining Temp. ° C. | $N_2SA$ of Calcined Thoria $m^2/g$. | X-ray Crystallite size in millimicrons | Gm. of Th $(NO_3)_4.4H_2O$ used per gm. of $ThO_2$ in peptizing |
|---|---|---|---|
| 500 | 41 | 9.5 | 0.15 |
| 650 | 23 | 14 | 0.10 |
| 750 | 9.2 | 30 | 0.047 |
| 800 | 8.1 | 43.5 | 0.032 |
| 850 | 8.3 | 60 | 0.023 |
| 1,000 | 2.2 | 200 | 0.007 |

*Example 3*

One hundred twenty grams of thorium nitrate tetrahydrate was calcined at a temperature of 650° C. for eighteen hours. The X-ray crystallite size of the thoria was about 8 millimicrons. The resulting thoria was suspended in water at a concentration of 20% by weight and then was peptized by adding 0.2 gram of thorium nitrate tetrahydrate per gram of the calcined thoria resulting from the decomposition of the nitrate, and heating with stirring at 80° C. The resulting sol was somewhat more turbid than a similar sol obtained from calcined oxalate.

*Example 4*

One hundred twenty grams of thorium hydroxide was ignited for two hours at 650 to 700° C. The resulting thoria was suspended in water at a concentration of 30% by weight and then peptized by addition of .07 gram of thoria nitrate tetrahydrate per gram of thoria. The X-ray crystallite size of this material was 21 to 27 millimicrons. A portion of the thoria was also peptized by adding hydrated thorium tetrachloride in an amount equivalent on a molar basis to the amount of thorium nitrate used in the first instance. Both of these sols were somewhat more turbid than the sol produced from the oxalate.

I claim:

1. In a process for producing a thoria aquasol the steps comprising (1) calcining a thermally unstable oxygen-containing thorium compound selected from the group consisting of the oxalate, nitrate, hydroxide, basic oxalate and basic nitrate at a temperature in the range of from 400 to 1100° C. until it is decomposed to thoria, (2) mixing the so-obtained thoria, in powder form, with an aqueous solution of a thorium salt of a monobasic acid, said salt being selected from the group consisting of the chloride, perchlorate, bromide, bromate, iodide, iodate, and nitrate, the molar ratio of thorium salt to thoria being in the range of $3\times10^{-4}A$ to $20\times10^{-4}A$, where A is the surface area of the thoria in square meters per gram as calculated from the crystallite dimensions determined by X-ray line broadening, and (3) heating the mixture to a temperature in the range of from 50 to 100° C., at a pH in the range from 2 to 4, whereby the thoria is peptized to form a sol in the aqueous medium.

2. A process of claim 1 wherein the thorium salt of a monobasic acid used in the aqueous solution of step (2) is thorium nitrate.

3. In a process for producing a thoria aquasol the steps comprising (1) calcining a thermally unstable, oxygen-containing thorium compound selected from the group consisting of the oxalate, nitrate, hydroxide, basic oxalate and basic nitrate at a temperature in the range of from 400 to 1100° C. until it is decomposed to thoria, (2) mixing the so-obtained thoria, in powder form, with an aqueous solution of a thorium salt of a monobasic acid, said salt being selected from the group consisting of the chloride, perchlorate, bromide, bromate, iodide, iodate, and nitrate, the molar ratio of thorium salt to thoria being in the range of $3\times10^{-4}A$ to $15\times10^{-4}A$, where A is the surface area of the thoria in square meters per gram as calculated from the crystallite dimensions determined by X-ray line broadening, and (3) heating the mixture to a temperature in the range of from 75 to 98° C. and vigorously agitating it, at a pH in the range from 2.5 to 3, whereby the thoria is peptized to form a sol in the aqueous medium.

No references cited.

UNITED STATES PATENT OFFICE

CERTIFICATE OF CORRECTION

Patent No. 3,162,605 December 22, 1964

Paul C. Yates

It is hereby certified that error appears in the above numbered patent requiring correction and that the said Letters Patent should read as corrected below.

Column 6, line 56, for "$3\times10^{-4}A$" read -- $6\times10^{-4}A$ --.

Signed and sealed this 27th day of April 1965.

(SEAL)
Attest:

ERNEST W. SWIDER
Attesting Officer

EDWARD J. BRENNER
Commissioner of Patents